United States Patent [19]

Hulting, Jr.

[11] Patent Number: 4,589,179
[45] Date of Patent: May 20, 1986

[54] FLEXIBLE POSITIONER

[75] Inventor: Thomas S. Hulting, Jr., East Peoria, Ill.

[73] Assignee: Caterpillar Tractor Co., Peoria, Ill.

[21] Appl. No.: 648,914

[22] Filed: Sep. 10, 1984

[51] Int. Cl.$^4$ .............................................. B23P 19/04
[52] U.S. Cl. ...................................... 29/256; 29/271; 411/392
[58] Field of Search .................. 269/130–132, 269/108; 29/256, 271–274; 911/392, 383, 386, 411, 424

[56] References Cited

U.S. PATENT DOCUMENTS 1,514,412 11/1924 Wilkinson ............................ 411/392
2,555,698 6/1951 Masheck ............................... 29/273
2,770,873 11/1956 Ramsey .................................. 29/273

FOREIGN PATENT DOCUMENTS 958192 9/1949 France ................................ 411/392
572218 9/1945 United Kingdom ................ 411/392

Primary Examiner—Robert C. Watson
Attorney, Agent, or Firm—Sterling R. Booth

[57] ABSTRACT

A flexible positioner is provided for moving and positioning an object relative to a base member. In large industrial and vehicular engines limited access openings are provided in the cylinder block to perform internal repairs and inspection such as for the half shelled bearings of a bearing cap. The partial removal of a heavy bearing cap through a limited access opening presents an assembly and disassembly problem. The problem is further compounded when the bearing cap mounting bolts are disposed at opposite oblique angle relative to the vertical centerline of engine or when the mounting bolts are parallel but an obstruction hinders assembly and disassembly. The subject flexible positioner is adapted to temporarily replace the bearing cap bolts and includes an elongate member having an intermediate flexible portion connected between first and second end portions. The flexible positioner further includes a member connected to the elongate member to move the bearing cap relative to the cylinder block in a path nonparallel to the axis of flexible positioner. As the bearing cap moves away from the cylinder block mounting surface, the flexible portion assumes a sinuous shape to compensate for the change in distance between the oblique angle of the cylinder block threaded hole and the bearing cap hole.

4 Claims, 5 Drawing Figures

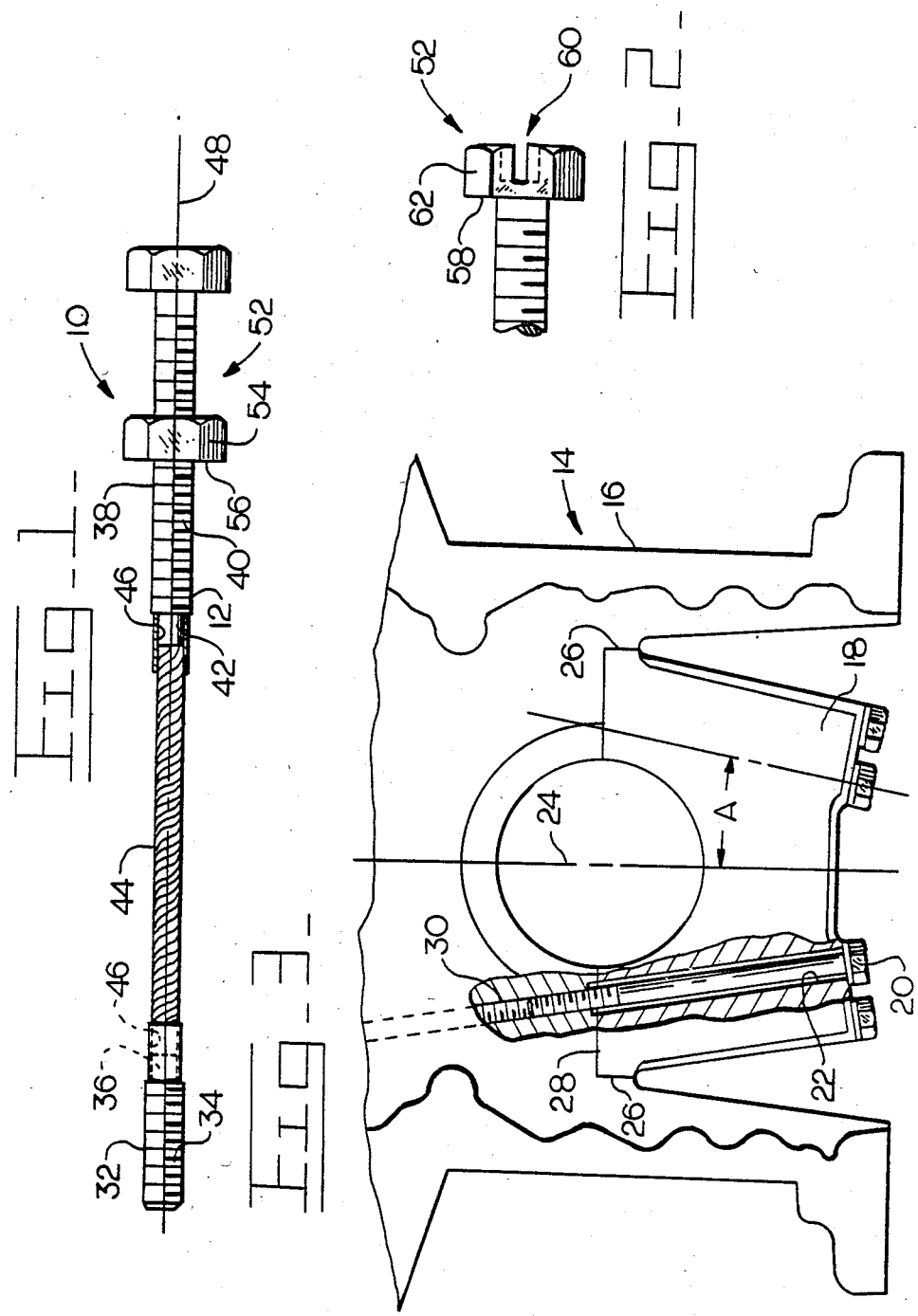

FLEXIBLE POSITIONER

DESCRIPTION

1. Technical Field

This invention relates generally to a flexible positioner and more particularly to a flexible positioning tool connectable to a base to position a weighted article relative to the base.

2. Background Art

The assembly and servicing of an internal combustion engine occasionally requires the use of special tools to position heavy articles such as main bearing caps in relation to a base or engine block. It is conventional practice to utilize rigid positioning members such as pins or bolts to raise, lower, align, or position the main bearing cap relative to the block. Occasionally, the bearing cap is secured to a cylinder block by nonparallel mounting bolts which are disposed at opposite oblique angles relative to the vertical centerline of the block and the bearing cap. This presents an assembly and disassembly problem of supporting and positioning of a bearing cap due to the misalignment of the bearing cap and block mounting holes. The joint mounting surface must therefore be in intimate contact before the nonparallel oblique angled mounting bolts can be installed or removed. Due to the resulting misalignment of the bearing cap and block mounting holes a rigid positioner will not allow the bearing cap to move. Another problem exists where the mounting bolts are parallel but an obstruction prevents the bearing cap from being moved in a path parallel to the axis of the mounting bolts.

One approach to the removal of a bearing cap has been to support the bearing cap by an apparatus, remove the restraining bolts, and move the bearing cap away from the block mounting surface. This type apparatus is bulky, costly and difficult to manipulate.

The present invention is directed to overcoming one or more of the problems as set forth above.

DISCLOSURE OF THE INVENTION

In one aspect of the invention a flexible positioner is provided for moving a bearing cap relative to a cylinder block. The flexible positioner includes an elongate member having an externally threaded first end portion adapted to be threadably connected to the block, a second end portion, a flexible intermediate portion connected between the first and second ends, and an axis extending longitudinally through the elongate member. A moving means is associated with the second end portion of the elongate member for moving the bearing cap in a path nonparallel to the axis of the elongate member.

In another aspect of the invention the flexible positioner is adapted to temporarily replace the bearing cap mounting bolts in a cylinder block and bearing cap of an internal combustion engine wherein the bearing cap bolts are disposed at opposite oblique angles relative to the vertical centerline of the engine. Sequentially each of the bearing cap bolts are removed from the cylinder block and a flexible positioner is threadably installed in at least two of the bearing cap bolt openings. A moving means associated with the second end of the flexible positioner is adjusted to contact the bearing cap whereupon any additional bearing cap bolts are removed. Each of the moving means is rotated in a direction to allow movement of the bearing cap linearly away from the cylinder block mounting surface in a path nonparallel to the axis of the elongate member.

After inspection, repair, or replacement of parts the moving means is rotated in an opposite direction to move the bearing cap linearly toward the cylinder block mounting surface in a path nonparallel to the axis of the flexible positioner. Each of the flexible positioners are then sequentially removed from the bearing cap and each of the obliquely angled bearing cap mounting bolts reinstalled into the cylinder block.

In large vehicular or stationary internal combustion engines the removal and positioning of a heavily weighted component such as a bearing cap of a cylinder block requires an apparatus capable of positioning and supporting the bearing cap. The problem is further compounded if the mounting bolts of the bearing cap are disposed at a nonparallel oblique angle relative to the mounting surfaces. To resolve the difficulty as noted above a flexible positioner having a flexible intermediate portion capable of assuming a sinuous shape and having a means to move the bearing cap temporarily replaces the rigid bearing cap mounting bolts.

BRIEF DESCRIPTION OF THE DRAWINGS

FIG. 1 is a diagrammatic view of an embodiment of the invention;

FIG. 2 is a partial view illustrating a portion of an alternate embodiment;

FIG. 3 is a fragmentary diagrammatic end view of a cylinder block, bearing cap, and bearing cap bolts of an internal combustion engine;

BEST MODE FOR CARRYING OUT THE INVENTION

Figure 4:
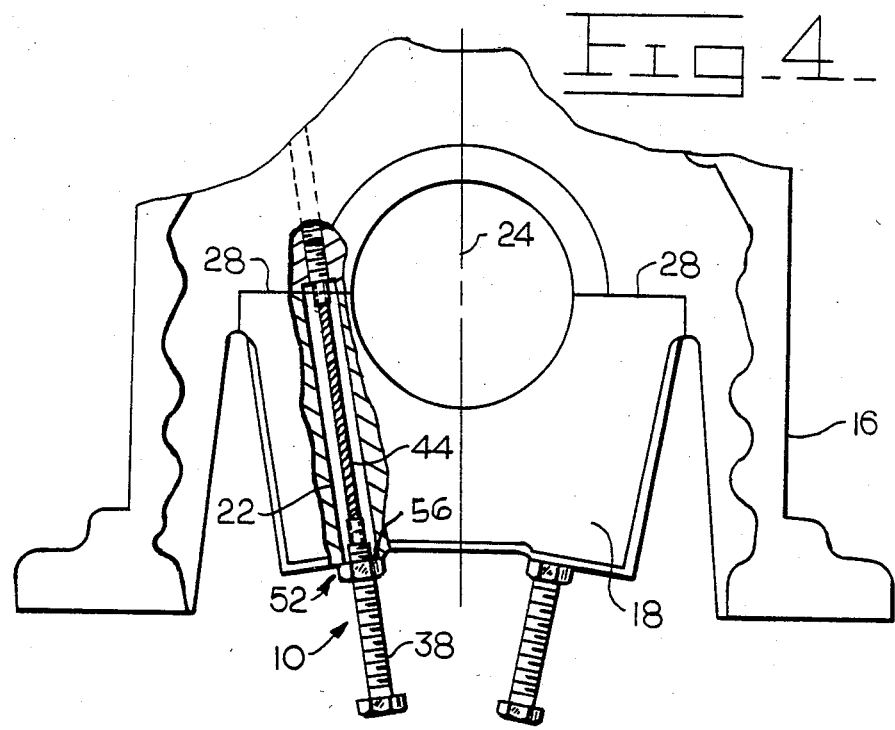
FIG. 4 is a view similar to FIG. 3, but illustrating the flexible positioner inserted through the bearing cap and threaded into the cylinder block.
Figure 5:
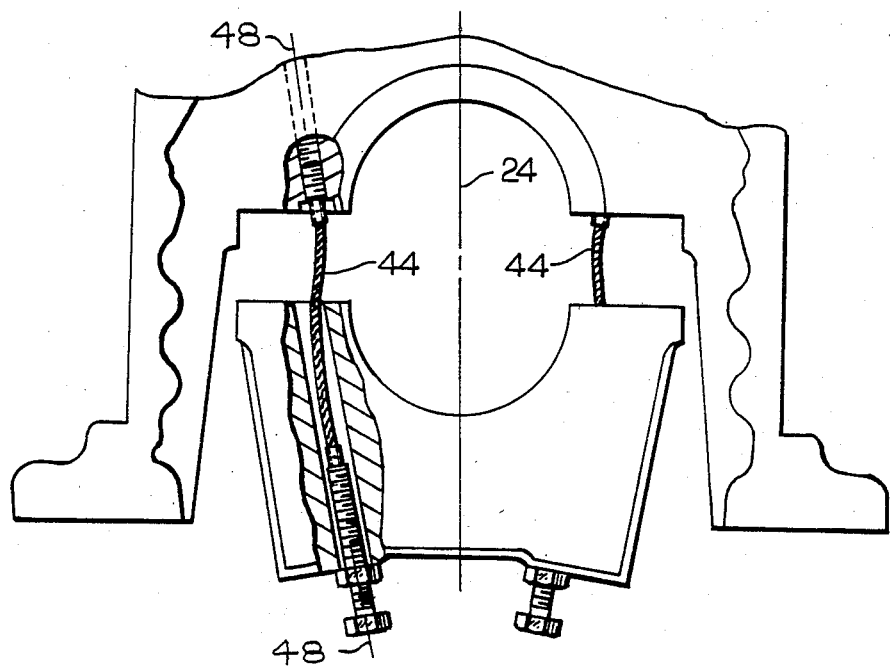
FIG. 5 is a view similar to FIGS. 3 and 4 but illustrates the bearing cap in a position away from the cylinder block and supported by the flexible positioner.

Referring now to the drawings, there is illustrated in FIG. 1 a flexible positioner indicated generally by the numeral 10 in the form of an elongate member 12. As shown in FIGS. 3–5 and as will hereinafter be described in detail, the flexible positioner 10 may, as an example, function as a service tool in an engine cylinder block structure 14 for moving a bearing cap 18 relative to a cylinder block 16.

FIG. 3 illustrates a partial view of the cylinder block structure 14 for an internal combustion engine including the cylinder block 16, the bearing cap 18, and a plurality of bearing cap retaining bolts 20. The bearing cap bolts 20 are disposed through an opening 22 at a nonparallel oblique angle A relative to the vertical centerline 24 of the cylinder block 16. The bearing cap 18 is restrained from transverse movement by a pair of bearing saddles 26 and is secured against a mounting surface 28 and the bearing saddles 26 by the resulting tightening forces imposed by the obliquely angled retaining bolts 20.

In this form the bearing cap bolts 20 can only be assembled or disassembled from the internal threads 30 of the block 16 when the joint mounting surfaces 28 are in contact one to the other.

The elongate member 12 illustrated in FIG. 1 includes a first end portion 32 of a generally elongate cylindrical shape having an external thread 34 thereon and a smaller stub shaft 36 at one end. The elongate member 12 further includes a second generally cylindrical end portion 38 having a smaller stub shaft 42 at one end. In a preferred embodiment the second end portion 38 is externally threaded the full length. A flexible elongate member 44 preferably in the form of wound substantially inextensible cable is connected to the stub shaft 36 of the first end portion 32 and the stub shaft 42 of the second end portion 38 by a pair of connectors 46. It is apparent the intermediate flexible member 44 can be connected to the flexible member 26 and the stub shafts 36,42 by any conventional means such as welding, threading, or crimping. The elongate member 12 has a longitudinal axis 48 passing through the center and extending the full length of the member.

In the embodiment of FIG. 1 a moving means 52 associated with second end portion 38 of the elongate member 12 is adapted to move the bearing cap 18 relative to the cylinder block in a path nonparallel to the axis of the elongate member 12. The moving means 52 includes the external thread 40 extending substantially the full length of the second end portion 38 of the elongate member 12 and an internally threaded member 54. The threaded member 54 is preferably a nut having a shoulder 56 and screwthreadably engaging the external thread 40 wherein the rotary motion of the threaded member 54 moves the threaded member 54 in a linear direction.

In an alternate embodiment of FIG. 2 the moving means 52 includes a flange 58 connected to the second end portion 38 of elongate member 12. In this embodiment rotary motion of the elongate member 12 causes the flange 58 to move in a linear direction by virtue of the threaded connection between the threaded end portion 34 and the thread 30 of the cylinder block.

As shown in FIGS. 1 and 2 a driving mechanism 60 is connected to the second end portion 38 of the elongate member 12. The driving mechanism 60 includes a plurality of flat surfaces 62 such as a hexagon shape adapted to be drivingly engaged by a tool. Alternatively, as shown in FIG. 2, the flat surfaces can be a slot or a square shape. It is clearly understood the second end portion 38 of the elongate member 12 and the flange 58 of the moving means 60 can be combined as a bolt head having the flange 58 and a head configuration having one or all of the above mentioned driving mechanisms.

FIG. 4 illustrates a partial view of the cylinder block structure 14 similar to FIG. 3 except the restraining bolts 20 have been removed and at least two of the flexible positioners 10 subsequently inserted through the bearing cap holes 22 and threadably connected to the cylinder block 16. The threaded member 54 of the moving means 52 associated with the second end portion 38 of the elongate member 12 is rotated towards the joint faces 28 moving the shoulder 56 of the threaded member 54 into contact with bearing cap 18. Each of the threaded members 54 of the moving means 52 of the flexible positioners 10 is subsequently rotated in a direction to allow movement of the bearing cap linearly away from the joint mounting surfaces 28 thus allowing the bearing cap to become disengaged from the cylinder block saddles 26 and move downwardly in a path parallel to the vertical centerline 24 of the block 16 as is best illustrated in FIG. 5. The flexible intermediate portion 44 of the elongate member 12 assumes a sinuous shape as the bearing cap 18 moves away from the joint mounting face 28.

Thus the method for moving a bearing cap 18 relative to a cylinder block 16 comprises the steps of removing one of the bearing cap mounting bolts 20, inserting a first flexible positioner 10 through the bearing cap hole 20, threading a threaded first end portion 32 of the flexible positioner 10 into the cylinder block 16, and adjusting a moving means 52 associated with the first flexible positioner 10 into contact with the bearing cap 18. The method further includes the steps of removing the other bearing cap mounting bolt 20, inserting a second flexible positioner 10 through the other bearing cap hole 20, threading a threaded first end portion 32 of the second flexible positioner 10 into the cylinder block 16, adjusting a moving means 52 associated with the second flexible positioner 10 into contact with the bearing cap 18, and rotating each of the moving means 52 in a direction to move the bearing cap 18 linearly away from the cylinder block 16 in a path nonparallel to the longitudinal axis of the flexible positioner.

INDUSTRIAL APPLICABILITY

In normal use the flexible positioner 10 is useful in the manipulating and servicing of the cylinder block bearing caps 18 associated with large industrial or vehicular internal combustion engines wherein the bearing cap retaining bolts 20 are disposed at an oblique angle A relative to the vertical centerline 24 of the engine. In large engines of the type mentioned a door or window opening at the side of the cylinder block 16 provides a limited access to the bearing caps 18 which are heavy (approximately 22 kg), large, and difficult to manipulate in a confined area.

In operation, each of the bearing cap mounting bolts 20 are sequentially removed and at least two of the flexible positioners 10 are inserted through the bearing cap bolt holes 20. The first end portion 32 of the flexible positioners 10 is then threadably connected to the cylinder block 16 and each of the moving means 52 associated with the flexible positioner 10 is adjusted to contact the bearing cap 18. Any additional bearing cap bolts 20 are removed thus relieving the clamping forces of the bearing cap to cylinder block. Each of the moving means 52 is rotated in a direction to allow movement of the bearing cap 18 linearly away from the cylinder block mounting surface in a path parallel to vertical centerline 24 of the engine and nonparallel to the axis 48 of the elongate member 12. As the bearing cap moves away from the joint mounting surfaces 28 the flexible portion 44 of the positioner progressively assumes a sinuous shape to compensates for the misalignment between the cylinder block threaded holes 30 and the bearing cap hole 22. After inspection and/or repair of the component parts the procedure is reversed and the bearing cap 18 is secured to the cylinder block 16.

As seen in FIG. 1 through FIG. 5 and the foregoing description of the invention the flexible positioner 10 is adaptable to move an object relative to a base wherein the mounting bolts 20 are either parallel to the vertical centerline 24 of the base or at an opposite oblique angle A relative to the vertical centerline 24 of the base.

Other aspects, objects and advantages of this invention can be obtained from a study of the drawing, the disclosure and appended claims.

I claim:

1. A flexible positioner for use in positioning an article to a base, the article and base having retainer receiving holes located on each side of the article and the base and at an angle to each other, the flexible positioner comprising:

a first threaded rigid end portion for engaging the retainer receiving holes in the base;

a second elongate threaded rigid end portion;

means at a distal end of the second end portion for imparting rotational movement thereto;

a flexible intermediate portion comprising an inextensible spirally wound cable attached to and extending between the end portions; and a nut on the second end portion between the means at the distal end and the flexible intermediate portion movable along the second end portion for moving the article with respect to the base.

2. The flexible positioner of claim 1 wherein the means at the end of the second end portion has a plurality of flat surfaces adapted to be engaged by a tool.

3. The flexible positioner of claim 1 wherein the second elongate member is substantially twice the length of the first end portion.

4. The flexible positioner of claim 3 wherein the flexible intermediate portion is no longer than the retainer receiving hole in the article.

* * * * *